United States Patent [19]

Hockett

[11] Patent Number: 5,022,155
[45] Date of Patent: Jun. 11, 1991

[54] HOSE TRIMMING APPARATUS

[75] Inventor: Wayne B. Hockett, Tampa, Fla.

[73] Assignee: Continuous Hose Co., Boynton Beach, Fla.

[21] Appl. No.: 445,963

[22] Filed: Dec. 4, 1989

[51] Int. Cl.⁵ ............................................. B23D 21/06
[52] U.S. Cl. ............................................. 30/93; 30/94
[58] Field of Search .................... 83/54; 30/92, 93, 94; 408/80

[56] References Cited

U.S. PATENT DOCUMENTS

| | | | |
|---|---|---|---|
| 1,231,743 | 7/1917 | Johnston | 408/80 |
| 1,448,877 | 3/1923 | Smith | 30/94 |
| 1,777,316 | 10/1930 | Kuffner | 408/80 |
| 2,226,078 | 12/1990 | Spahn | 408/80 |

FOREIGN PATENT DOCUMENTS

| | | | |
|---|---|---|---|
| 3406098 | 8/1985 | Fed. Rep. of Germany | 30/94 |
| 52993 | 5/1967 | Poland | 30/92 |

Primary Examiner—Douglas D. Watts
Assistant Examiner—John M. Husar
Attorney, Agent, or Firm—Frijouf, Rust & Pyle

[57] ABSTRACT

An apparatus and method is disclosed for an improved hose trimming apparatus for trimming a hose, the hose having an internal bore encompassed by a sidewall. The apparatus comprises a support member and securing means disposed on the support member for securing the support member to the hose. A cutting element is rotatably mounted relative to the support member. A handle rotates the cutting element relative to the support member enabling the cutting element to sever the sidewall of the hose as the cutting element is rotated relative to the support member.

10 Claims, 7 Drawing Sheets

HOSE TRIMMING APPARATUS

BACKGROUND OF THE INVENTION

1. Field Of The Invention

This invention relates to cutting and trimming and more particularly to an improved apparatus and method for cutting and/or trimming a terminal end of a hose.

2. Information Disclosure Statement

The prior art has provided varied types of devices and mechanisms for the cutting and/or the trimming of a hose. Devices and mechanisms have been designed for the cutting and/or the trimming of hoses as simple as a conventional garden hose as well as heavy duty hoses capable of handling high pressure fluids. Many hoses incorporate a single or multiple layers of fibers to add mechanical strength to the sidewall of the hose. The incorporation of fibers or other materials within the sidewall of the hose not only adds mechanical strength to the hose but also reduces radial outward expansion of the hose when subjected to a high pressure fluids. However, the addition of the single or multiple layers of fibers within the sidewall of the hose impedes cutting and/or trimming of the hose.

Although, various types of hose cutting and/or trimming devices have been proposed by the prior art, most of these devices are overly complex, large and costly. Accordingly, many prior art hose cutting and/or trimming devices do not find wide spread use by hose consumers and are only used by hose manufacturers or hose distributors. Most hose consumers merely sever the hose with a conventional mechanical or electrical saw since the cost and transportability of the prior art hose cutting and/or trimming device are beyond the cost requirement and the use requirement of the hose consumer.

When a hose is severed by a cutting blade such as a hacksaw or a bandsaw, a serration pattern is produced on the terminal end of the hose. In many cases, the method of coupling the terminal end of the hose to the terminal end of another hose through a coupling does not require a smooth terminal edge. In these cases, the serration pattern on the terminal end of the hose does not cause an undue problem with regard to the operation of the hose and or the coupling.

In general, a new hose has a curl or bend due to the storage of the new hose on a drum or in a roll. Accordingly, when a new hose is severed by a cutting blade such as a hacksaw or a bandsaw, it is very difficult to cut the terminal end of the hose to be perpendicular to the side wall of the hose. Normally, specialized equipment is required to cut the terminal end of a new hose to be perpendicular to the side wall of the hose. Such specialized equipment is normally beyond the cost requirement and the use requirement of the hose consumer. Fortunately, in many cases, the method of coupling the terminal end of the hose to the terminal end of another hose through a coupling does not require the terminal end of the hose to be perpendicular to the side wall of the hose.

In my prior U.S. Pat. No. 4,666,193 issued May 19 1987, I disclosed a novel hose coupling having a terminal insert and an annular seal. In a second U.S. Pat. No. 4,666,188 issued May 19, 1987, I disclosed a novel hose coupling wherein the terminal end of a first hose was abutted against the terminal end of a second hose for providing a hose to hose coupling. This hose to hose coupling had the benefit of eliminating any contact of the material internal the hose with any hose coupling material. For example, in a sand blasting or wet blasting operation, the particulate material within the hose did not abrade the coupling material since the first and second hoses were coupled end to end to simulate a single or continuous hose. In a subsequent patent application Ser. No. 413,845 filed Sept. 27, 1989, I disclosed a further improvement to my prior coupling which also incorporated a hose to hose engagement.

Although the hose to hose engagement provides superior results over the prior art coupling devices, the terminal ends of the hoses must be accurately severed to be free of the serration pattern produced by conventional mechanical or electric saws. Furthermore, the hose to hose engagement of my prior inventions require the terminal ends of each of the abutting hose sections to be perpendicular to the side wall of the respective hose section.

Therefore it a primary object of this invention is to provide a simple, inexpensive and portable hose trimming apparatus for trimming or dressing a terminal end of a hose to produce a smooth surface on the terminal end of the hose and to produce a terminal end of the hose which is perpendicular to the side wall of the hose.

Another object of this invention is to provide an improved hose trimming apparatus incorporating means for securing the apparatus to a hose for enabling a cutting element to rotate relative to the hose for severing the side wall of the hose.

Another object of this invention is to provide an improved hose trimming apparatus incorporating a support member which is at least partially insertable within an internal bore of the hose and incorporating expandable means disposed on the support member for expanding within the internal bore of the hose for securing the support member to the hose.

Another object of this invention is to provide a hose trimming apparatus for trimming a hose which requires no electric power and may quickly sever a hose with simple mechanical effort.

Another object of this invention is to provide an improved hose trimming apparatus which may be used by an unskilled or semi-skilled person and still provide superior results.

Another object of this invention is to provide an improved hose trimming apparatus which is safe to use by unskilled or semi-skilled person.

Another object of this invention is to provide an improved hose trimming apparatus which is reliable and durable and which incorporates a low cost replaceable cutting element.

The foregoing has outlined some of the more pertinent objects of the present invention. These objects should be construed as being merely illustrative of some of the more prominent features and applications of the invention. Many other beneficial results can be obtained by applying the disclosed invention in a different manner or modifying the invention with in the scope of the invention. Accordingly other objects in a full understanding of the invention may be had by referring to the summary of the invention, the detailed description describing the preferred embodiment in addition to the scope of the invention defined by the claims taken in conjunction with the accompanying drawings.

SUMMARY OF THE INVENTION

The present invention is defined by the appended claims with specific embodiments being shown in the attached drawings. For the purpose of summarizing the invention, the invention relates to an improved hose trimming apparatus for trimming a hose, the hose having an internal bore encompassed by a sidewall. The apparatus comprises a support member and securing means disposed on the support member for securing the support member to the hose. A cutting element is rotatably mounted relative to the support member with means for rotating the cutting element relative to the support member enabling the cutting element to sever the sidewall of the hose as the cutting element is rotated relative to the support member.

In a more specific embodiment of the invention, the support member comprises a rod adapted to be at least partially inserted within the internal bore of the hose with the securing means comprising expandable means disposed on the support member for expanding within the internal bore of the hose for securing the support member to the hose. The support member comprises a rod having a first and a second end with the securing means including expandable means disposed proximate the first end of the support member and with the cutting element being rotatably mounted proximate the second end of the support member.

In one embodiment of the invention, the securing means includes an expandable collet disposed proximate the first end of the support member with means for biasing the cutting element into engagement with the sidewall of the hose. The means for biasing the cutting element into engagement with the means has a nonengaging position and an engaging position such that the selector means inhibits the cutting element from engaging with the sidewall of the hose when the selector means is in the non-engaging position and permits the cutting element to engage with the sidewall of the hose when the selector means is in the engaging position.

The means for rotating the cutting element relative to the support member includes the cutting element being affixed to a cutting arm. The cutting arm is journalled about the support member with a handle means affixed to the cutting arm for rotating the cutting element relative to the support member for enabling the cutting element to sever the sidewall of the hose as the handle means is rotated relative to the support member.

The support member includes a taper disposed for cooperation having an expandable collet with an expander control disposed on the second end of the support member for enabling the taper to expand the expandable collet in response to the expander control for expanding the expandable collet within the internal bore of the hose for securing the support member to the hose.

The invention is also incorporated into the method of trimming the end of a hose having an internal bore encompassed by a sidewall, comprising the steps of securing a support member to the hose and moving a cutting element rotatably mounted relative to the support member into engagement with the sidewall of the hose. The process includes rotating the cutting element relative to the support member for severing the sidewall of the hose and removing the support member from the hose.

In a more specific embodiment of the process, the step of securing the support member to the hose comprises inserting a support member into the internal bore of the hose and enlarging an expandable means disposed on the support member within the internal bore of the hose for securing the support member to the hose. The step of moving the cutting element into engagement with the sidewall of the hose includes biasing the cutting element into engagement with the sidewall of the hose. Preferably, the step of rotating the cutting element relative to the support member includes rotating a handle for severing the sidewall of the hose.

The foregoing has outlined rather broadly the more pertinent and important features of the present invention in order that the detailed description that follows may be better understood so that the present contribution to the art can be more fully appreciated. Additional features of the invention will be described hereinafter which form the subject of the claims of the invention. It should be appreciated by those skilled in the art that the conception and the specific embodiments disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a fuller understanding of the nature and objects of the invention, reference should be made to the following detailed description taken in connection with the accompanying drawings in which.

Similar reference characters refer to similar parts throughout the several Figures of the drawings.

DETAILED DISCUSSION

Figure 1:
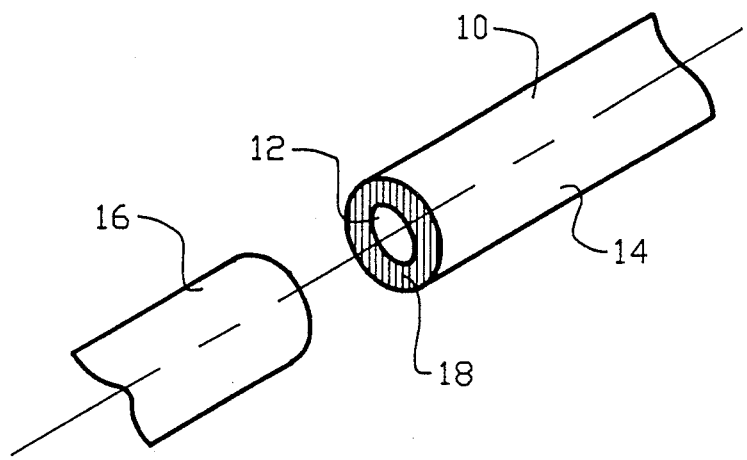
FIG. 1 is an isometric view of a hose end which has been trimmed with the apparatus and method of the present invention.

FIG. 1 is an isometric view of a conventional rubber hose 10 including an internal bore 12 and an outer sidewall 14. The hose 10 has been trimmed to remove a trimmed portion 16 thereby providing a terminal end 18 having a smooth surface which is perpendicular to the outer sidewall 14. The terminal end 18 having a smooth surface and which is perpendicular to the outer sidewall 14 was accomplished through the use of the present invention as will be described hereinafter.

Figure 2:
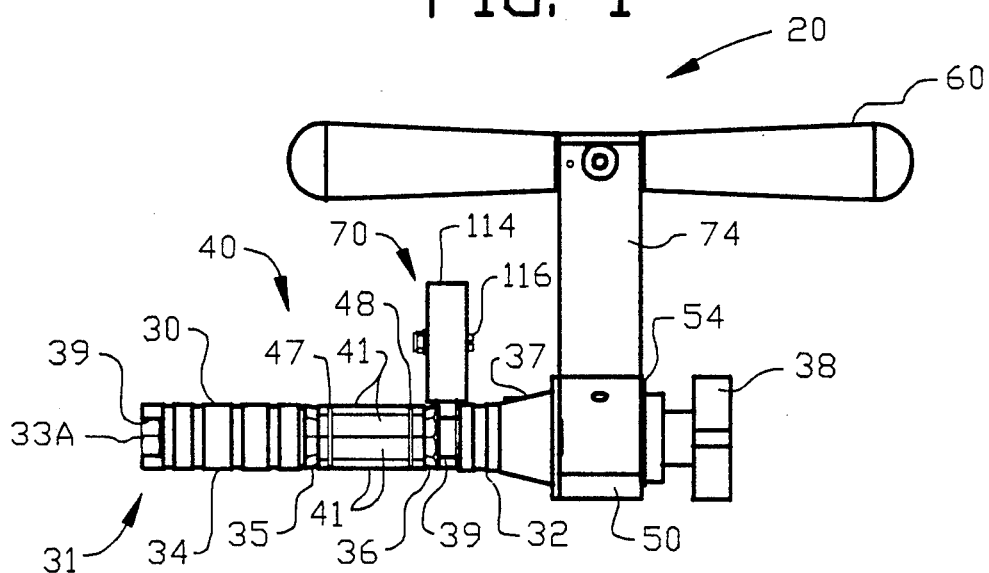
FIG. 2 is a front view of the improved hose trimming apparatus of the present invention.
Figure 3:
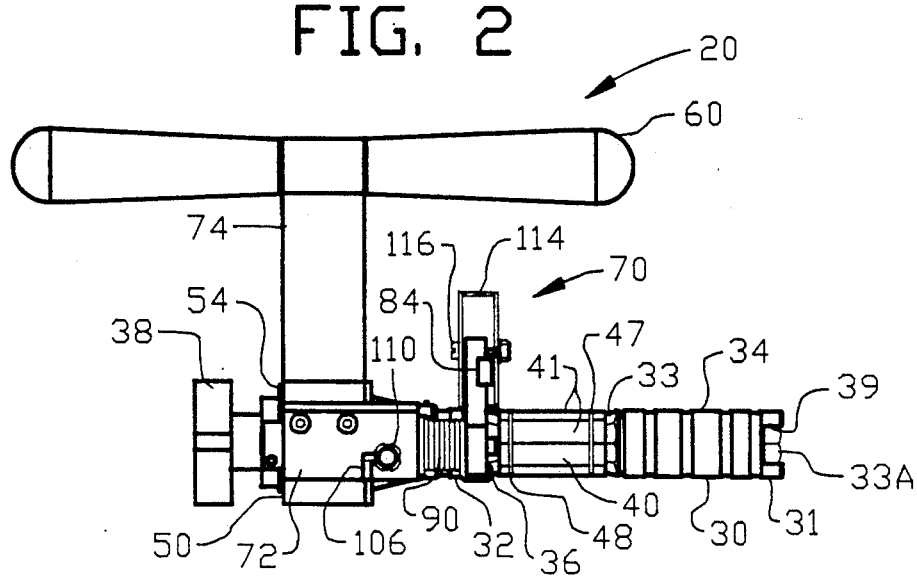
FIG. 3 is a rear view of the improved hose trimming apparatus of the present invention.

FIGS. 2-10 illustrate various views of the improved hose-trimming apparatus 20 for trimming the hose 10 and for producing the terminal end 18. As shown in FIGS. 2 and 3, the hose trimming apparatus 20 comprises a support member 30 adapted to be at least partially inserted within the internal bore 12 of the hose 10. Securing means 40 is disposed on the support member 30 for securing the support member 30 to the hose 10. A housing 50 rotatably mounts a handle 60 and a cutter 70 relative to the support member 30. The handle 60 rotates the cutter 70 relative to the support member 30 as the handle 60 is rotated relative to the hose 10 causing the cutter 70 to sever the sidewall 14 of the hose 10 as the handle 60 is rotated relative to the hose 10.

As shown more fully in FIGS. 4, 4A, 5 and 5A, the support member 30 defines a first and a second end 31 and 32 and comprises a threaded bolt 33 having a bolt head 33A. The threaded bolt 33 extends through a spacer 34, a first and a second wedge washer 35 and 36 and extends through a tapered support 37. The a centering support shown as a tapered support 37 extends through and is rotatably mounted relative to the housing 50. A nut 38 engages with the threads of the threaded bolt 33 and abuts the opposed side of the housing 50. The spacer 34, the first and second wedge washers 35 and 36 and the tapered support 37 are annular and have internal bores as shown for permitting the bolt 33 to freely slide therethrough while maintaining proper alignment of the spacer 34 and the wedge washers 35 and 36 relative to the threaded bolt 33. The bolt head 33A is received within a recess 39 in the spacer 34 to prevent rotation of the threaded bolt 33 relative to the spacer 34.

The securing means 40 radially expands within the internal bore 12 of hose 10 for securing the hose 10 relative to the support member 30. The securing means 40 comprises an expandable collet comprising a plurality of collet elements 41, each having a first angled surface 42 and a second angled surface 43. The plurality of collet elements 41 are further provided with a first and a second groove 44 and 46 for receiving resilient retainers 47 and 48 such as an O-ring or the like. The plurality of collet elements 41 in combination with the wedge washer 35 and 36 provide the expansion shown in FIGS. 5 and 5A relative to the normal position of the plurality of collet elements 41 shown in FIGS. 4 and 4A.

Figure 7:
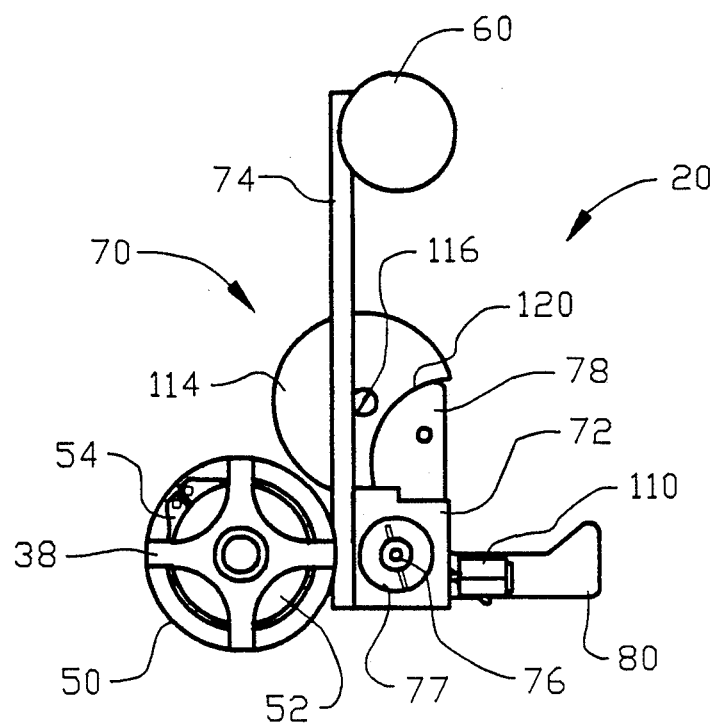
FIG. 7 is a right side view of FIG. 2.

The tapered support 37 is retained within the housing 50 by a locking washer 54 as best shown in FIG. 7. The tapered support 37 also defines an undercut 37A which will be described in greater detail hereinafter. Under this arrangement, the threaded bolt 33, the spacer 34, the first and second wedge washer 35 and 36, the tapered support 37 and the nut 38 rotate in unison relative to the housing 50. The tapered support 37 acts to temporarily center the support 30 within the internal bore 12 of the hose 10 prior to the expansion of the securing means 40.

Figure 4:
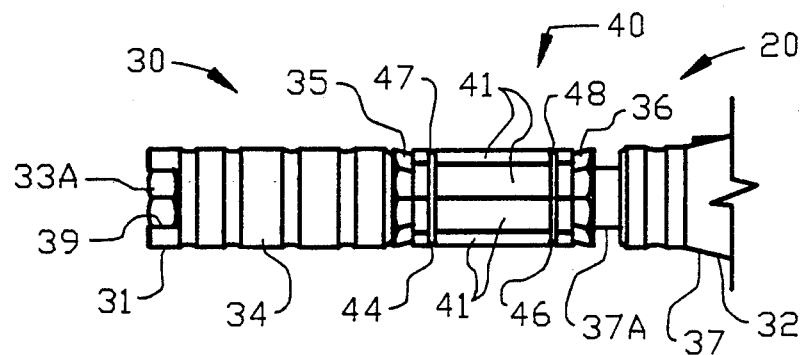
FIG. 4 is an enlarged view of a portion of FIG. 2 illustrating a securing means in a normal position.
Figure 4A:
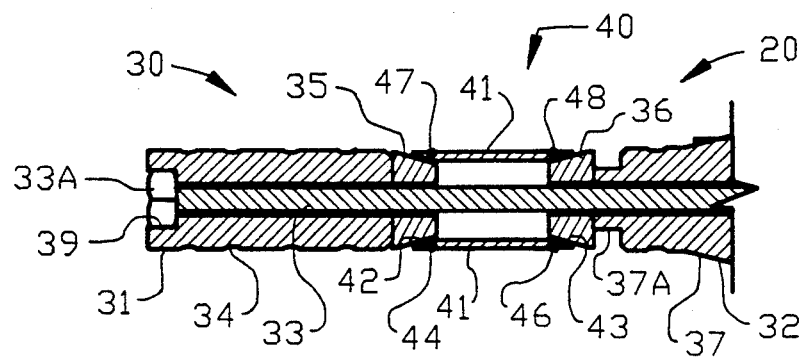
FIG. 4A is a sectional view of FIG. 4.
Figure 5:
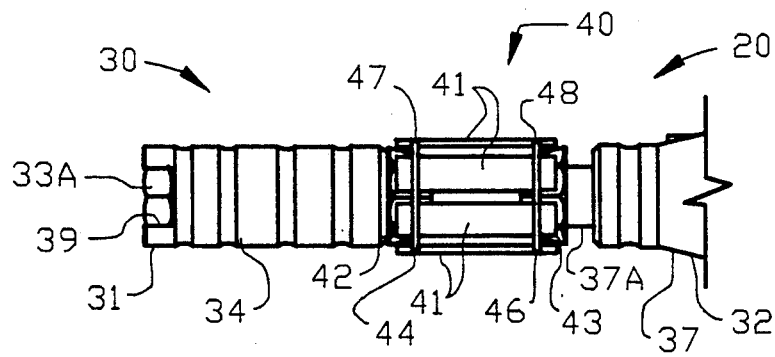
FIG. 5 is an enlarged view similar to FIG. 4 illustrating the securing means in an expanded position.
Figure 5A:
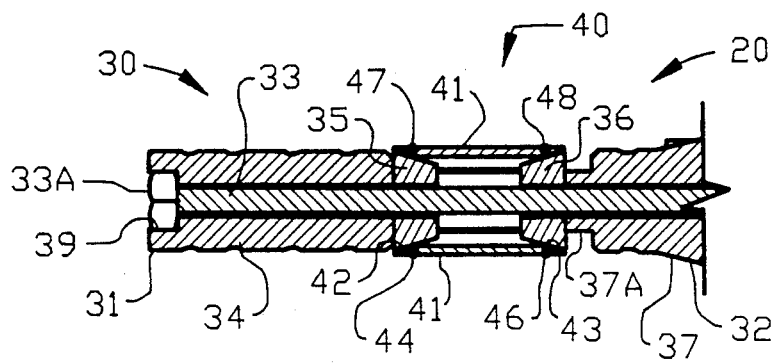
FIG. 5A is a sectional view of FIG. 5.

When the nut 38 is loosened from the threaded bolt 33, the resilient retainers 47 and 48 contract the collet elements 41. The angle surfaces 42 and 43 on the collet elements 41 act on the first and second wedge washers 35 and 36 to separate the first and second wedge washers 35 and 36 from one another. The separating first and second wedge washers 35 and 36 separate the spacer 34 from the tapered support 37 as shown in FIGS. 4 and 4A. When the nut 38 is tightened onto the threaded bolt 33, the spacer 34 moves the first and second wedge washers 35 and 36 towards one another. The first and second wedge washers 35 and 36 act on angle surfaces 42 and 43 to expand the collet elements 41 as shown in FIGS. 5 and 5A into engagement with the internal bore 12 of hose 10. When the securing means 40 is in contact with the internal bore 12 of hose 10, the support member 30 and the tapered support 37 is in fixed relation to the hose 10.

Figure 8:
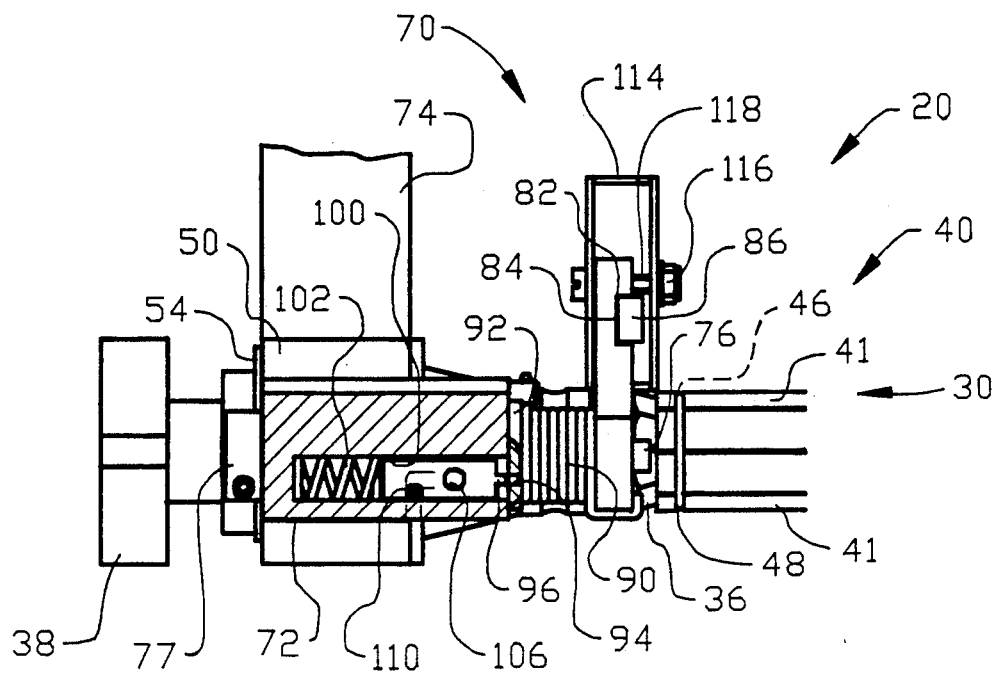
FIG. 8 is an enlarged view partially in section of a portion of FIG. 3.
Figure 9:
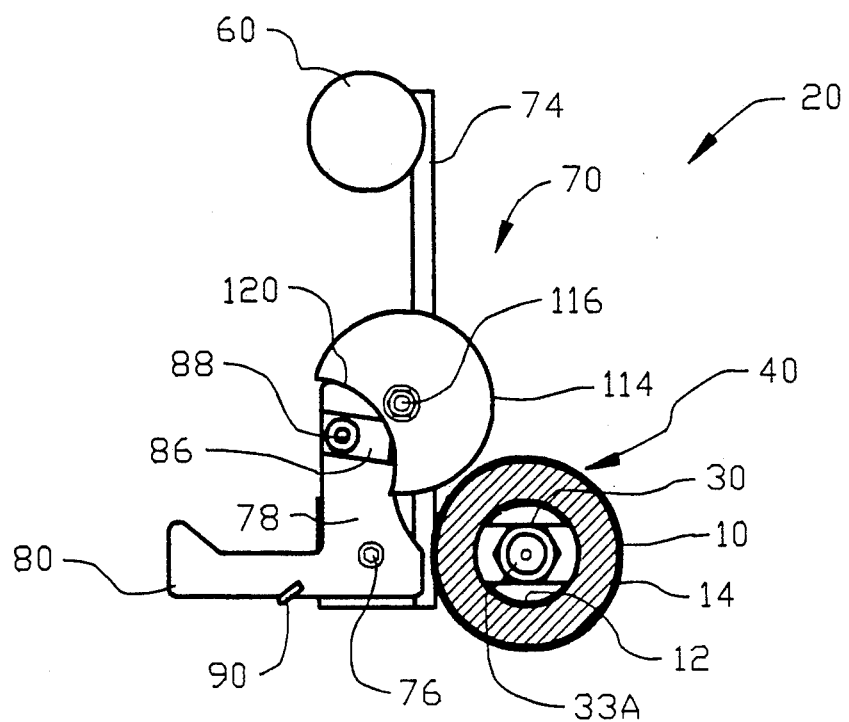
FIG. 9 is a left side view of the improved hose trimming apparatus secured to a hose with a cutting element in a nonengaging position.
Figure 10:
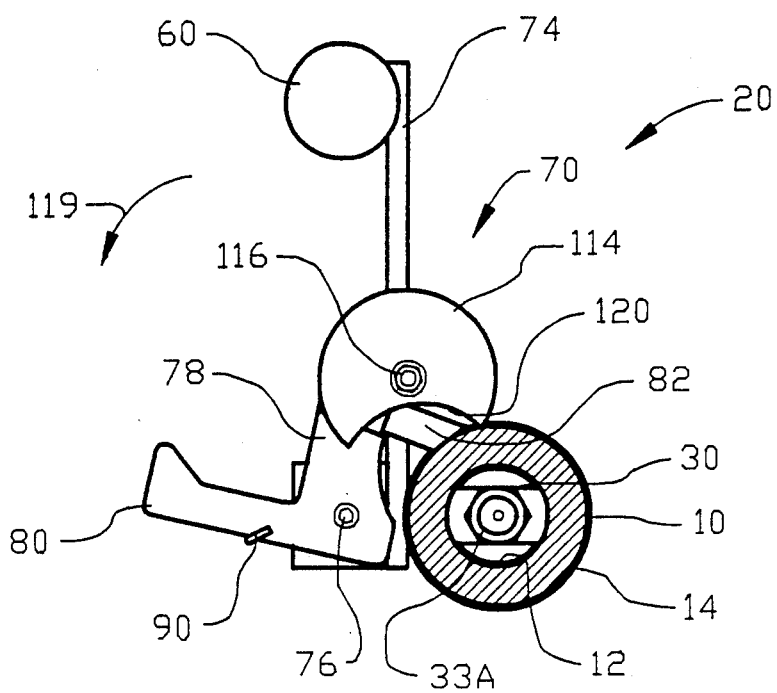
FIG. 10 is a left side view of the improved hose trimming apparatus secured to the hose with the cutting element in an engaging position.

A handle arm 62 is secured the housing 50 with the handle 60 being affixed to an end of the handle arm 62. The cutter 70 comprises the cutter housing 72 secured to the housing 50 with a handle arm 62 interposed therebetween. As best shown in FIGS. 8-10, the cutter housing 72 supports a rotatable shaft 76 of rotatably mounting a cutter arm 78 relative to the cutter housing 72. The rotatable shaft 76 is retained relative to the cutter housing 72 by a ring 77. The cutter arm 78 includes a cutter handle 80 for enabling an operator to manipulate the position of the cutter arm 78. The cutter arm 78 also includes a cutting element 82 shown as a blade secured to the cutter arm 78. More specifically, the cutting element 82 is received within a cutting arm recess 84 and is retained therein by an overlaying member 86 and a machine screw 88. Accordingly, the cutting element 82 may be easily replaced by removing the machine screw 88 and the overlaying member 86, replacing the old cutting element 82 by a new cutting element 82, and reinstalling the overlaying member 86 and the machine screw 88.

Figure 6:
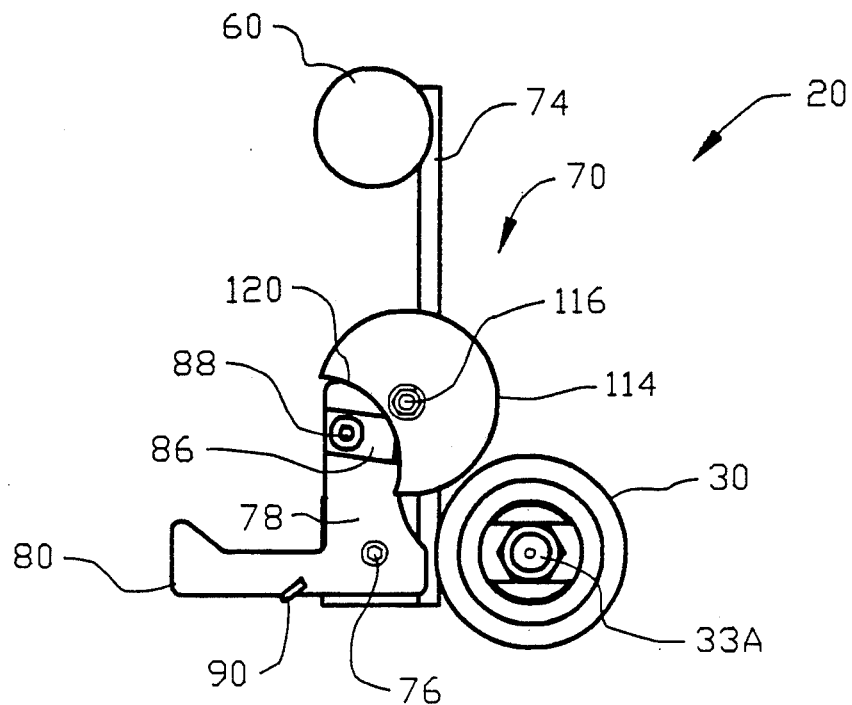
FIG. 6 is a left side view of FIG. 2.

A cutter arm spring 90 is interposed between the cutter housing 72 and the cutter arm 78 for biasing the cutting element 82 into engagement with the outer sidewall 14 of the hose 10 as shown in FIG. 10. The rotatable shaft 76 supporting cutter arm 78 includes a shaft washer 92 which is in fixed position relative to the rotatable shaft 76. The shaft washer 92 includes a washer bore 94 for receiving a locking pin 96 for locking the cutter arm 78 into the non-engaging position as shown in FIGS. 6, 7 and 9 against the urging of the cutter arm spring 90.

As best shown in FIG. 8, the cutter housing 72 includes a housing bore 100 receiving the locking pin 96 therein. A pin with the washer bore 94 for locking the cutter arm 78 in the non-engaging position against the urging of the cutter arm spring 90. When the cutter arm 78 is in the engaging position as shown in FIG. 10, the shaft washer 92 retains the locking pin 96 within housing bore 100 against the urging of the pin spring 102.

The cutter housing 72 defines an L-shaped slot 106 extending through the cutter housing 72 into the housing bore 100. An actuator pin 110 is secured to the locking pin 96 for moving the locking pin 96 upon movement of the actuator 110. When the actuator pin 110 is placed into the position shown in FIG. 3, the locking pin 96 is free to move outwardly under the urging of the pin spring 102 to engage with the washer bore 94 when the washer bore 94 is in registry with the locking pin 96 for locking the cutter arm 78 against the urging of the cutter arm spring 90. When the actuator pin 110 is placed into the position shown in FIG. 8, the actuator pin 110 prevents the locking pin 96 from moving outwardly under the urging of the pin spring 102 and permits the cutter arm spring 90 to move the cutting element 82 into engagement with the outer sidewall 14 of the hose 10 as shown in FIG. 10.

The cutter 70 also comprises a cutter shield 114 shown as a semicircular shield mounted to the cutter arm 78 by a shield pivot 116. A shield spring 118 shown in FIG. 8, biases the cutter shield 114 into a position for covering the cutting element 82 as shown in FIGS. 6, 7 and 9. When the cutter arm 78 is permitted to move the cutting element 82 into engagement with the outer sidewall 14 of the hose 10 as shown in FIG. 10, the cutter shield 114 will rotate out of the protective position as shown in FIGS. 6, 7 and 9 into the position shown in FIG. 10 upon rotation of the handle 60 relative to the hose 10 as shown by the arrow 119 in FIG. 10. A semicircular surface 120 defined by the cutter shield 114 provides a stop or a limit to the movement of the cutting element 82 which sufficient to sever the outer sidewall 14 of the hose 10 but is insufficient to engage with the undercut 37A of the tapered support 37.

Figure 11:
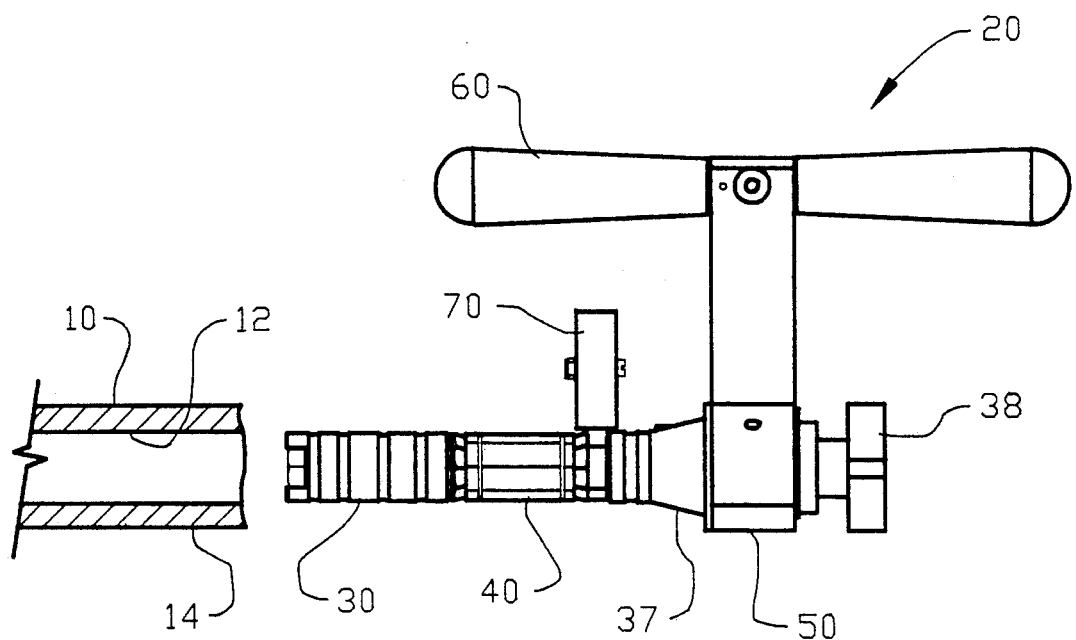
FIG. 11 is a first step in the method of trimming the end of the hose illustrating the positioning of a support member adjacent the internal bore of the hose.

FIG. 11 is a first step in the method of trimming the hose 10 to remove the trimmed portion 16 thereby providing a terminal end 18 having a smooth surface which is perpendicular to the outer sidewall 14 as shown in FIG. 1. The first step in the method includes positioning of the support member 30 adjacent the internal bore 12 of the hose 10.

Figure 12:
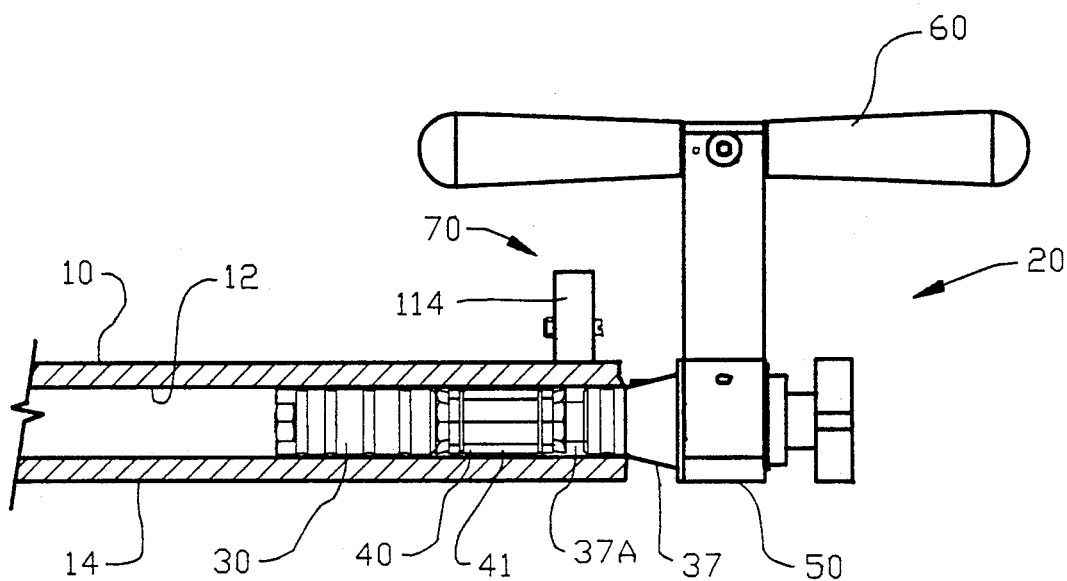
FIG. 12 is a second step in the method of trimming the end of the hose illustrating the insertion of the support member into the internal bore of the hose.

FIG. 12 is a second step in the method of trimming the end of the hose 10 illustrating the insertion of the support member 30 into the internal bore 12 of the hose 10. The centering support or tapered support 37 acts to temporarily center the support 30 within the internal bore 12 of the hose 10 prior to the expansion of the securing means 40.

Figure 13:
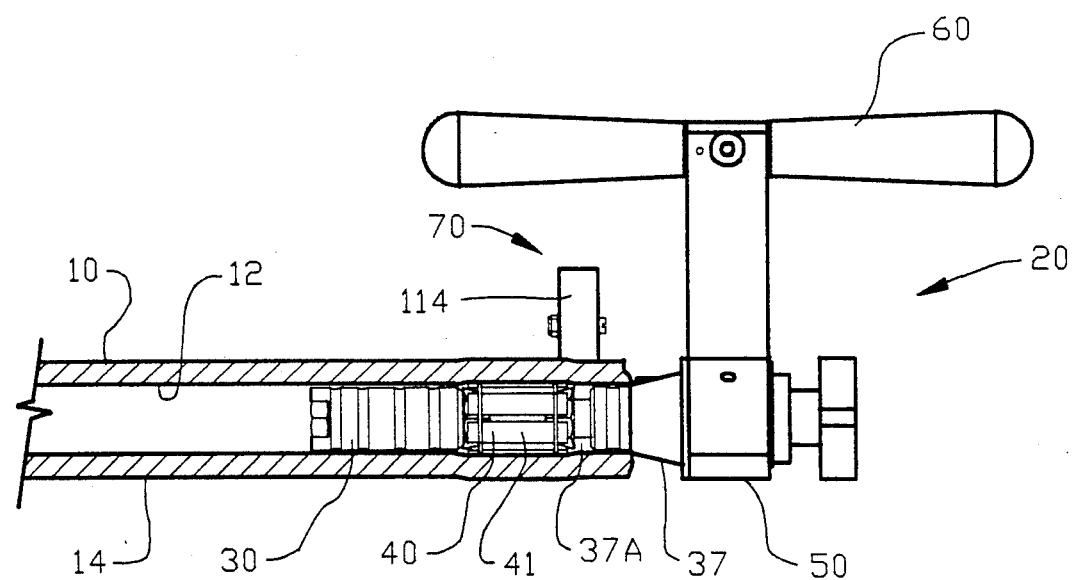
FIG. 13 is a third step in the method of trimming the end of the hose illustrating the enlargement of a securing means within the internal bore of the hose.

FIG. 13 is a third step in the method of trimming the end of the hose illustrating the enlargement of the securing means 30 within internal bore 12 of the hose 10. The enlargement of the securing means 30 within internal bore 12 of the hose 10 is accomplished by tightening the nut 38 onto the threaded bolt 33 causing the spacer 34 to move the first and second wedge washers 35 and 36 towards one another. The first and second wedge washers 35 and 36 act on angle surfaces 42 and 43 to expand the collet elements 41 into engagement with the internal bore 12 of hose 10 such that the support member 30 and the tapered support 37 is in fixed relation to the hose 10.

Figure 14:
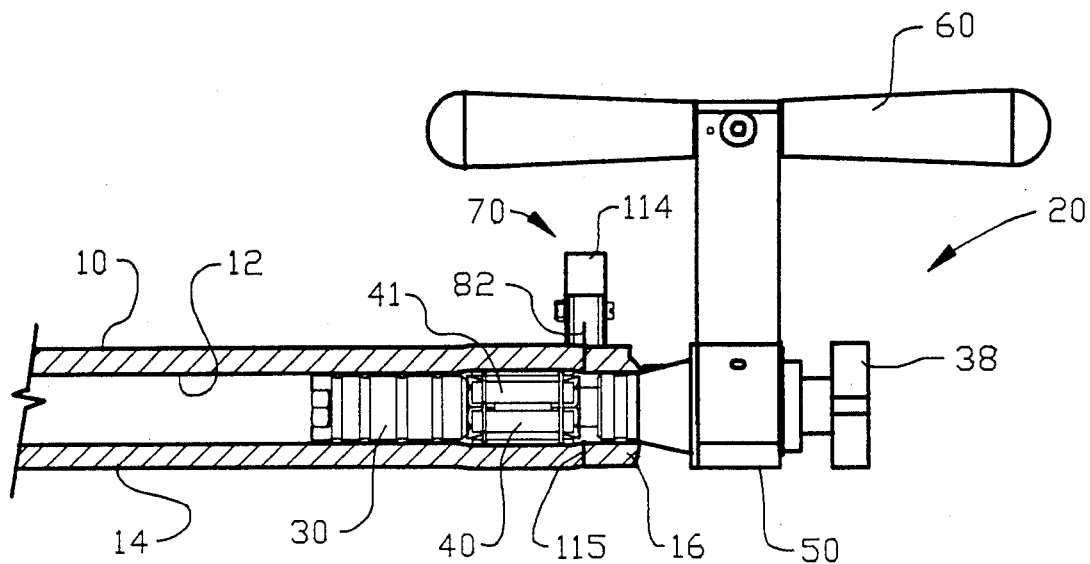
FIG. 14 is a fourth step in the method of trimming the end of the hose illustrating the cutting element trimming with the sidewall of the hose.

FIG. 14 is a fourth step in the method of trimming the end of the hose 10 illustrating the cutting element 70 trimming with the sidewall 14 of the hose 10. The actuator pin 110 is placed into the position shown in FIG. 8 to prevent the locking pin 96 from moving outwardly under the urging of the pin spring 102 thus permitting the cutter arm spring 90 to move the cutting element 82 into engagement with the outer sidewall 14 of the hose 10. As can be seen in FIG. 14, the cutting element 82 is aligned with the undercut 37A. The cutter shield 114 rotates out of the protective position upon rotation of the handle 60 relative to the hose 10 as indicated by the arrow 119 in FIG. 10. In most cases only a small number of rotations of the handle 60 relative to the hose 10 are required for the cutting element 82 to cut and finally sever the sidewall 14 of the hose 10 as shown by 125. After the cutting element 82 has severed the sidewall 14 of the hose 10, the semicircular surface 120 limits the movement of the cutting element 82 prior to engaging with the undercut 37A. After the cutting element 82 has severed the sidewall 14 of the hose 10, the trimmed portion 16 is severed from the remainder of the hose 10 thereby providing a terminal end 18 having a smooth surface which is perpendicular to the outer sidewall 14.

Figure 15:
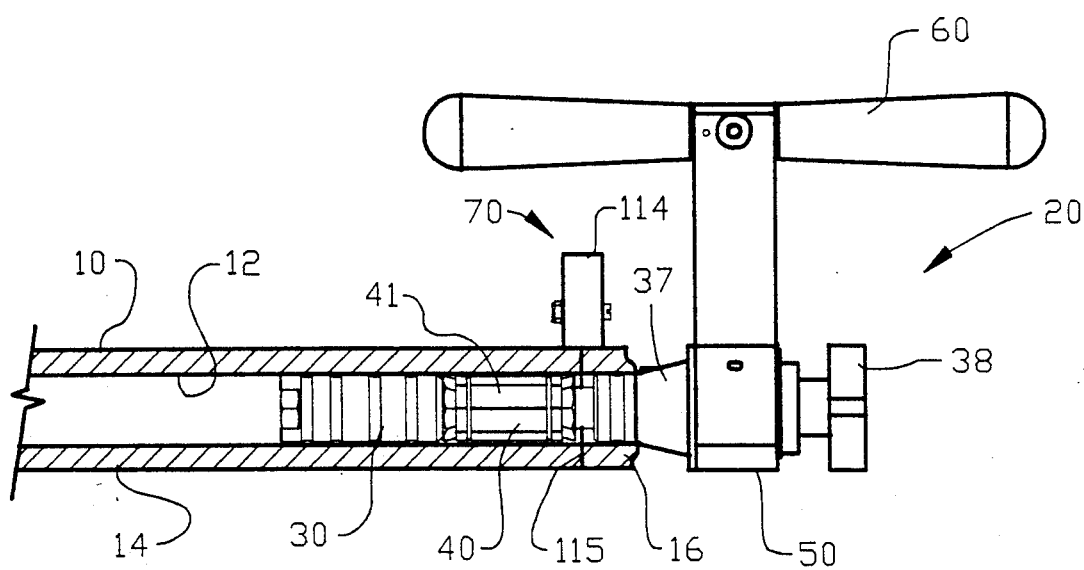
FIG. 15 is a fifth step in the method of trimming the end of the hose illustrating the reduction of the securing means within internal bore of the hose prior to removal of the support member from the internal bore of the hose.

FIG. 15 is a fifth step in the method of trimming the end of a hose 10 illustrating the reduction of the securing means 40 within internal bore 12 of the hose 10 prior to removal of the support member 10 from the internal bore 12 of the hose 10. The nut 38 is loosened from the threaded bolt 33 to enable the resilient retainers 47 and 48 to contract the collet elements 41. The angle surfaces 42 and 43 on the collet elements 41 act on the first and second wedge washers 35 and 36 to separate the first and second wedge washers 35 and 36 from one another thus separating the spacer 34 from the tapered support 37 to reduce the diameter of the collet elements 41. After the collet elements 41 have been reduced in diameter, the support member 30 may be withdrawn for the internal bore 12 of the hose 10 thus completing the method.

The forgoing hose trimming Apparatus 20 provides a simple, inexpensive and portable device and method for trimming or dressing the terminal end 18 of the hose 10 which produces a smooth surface on the terminal 18 end of the hose 10 and which produces a terminal end 18 of the hose 10 which is perpendicular to the side wall 14 of the hose 10. The hose trimming apparatus 20 requires no electric power and may quickly sever the hose 10 with simple mechanical effort. The hose trimming apparatus 20 which may be safely used by an unskilled or semi-skilled person and still provide superior results. The hose trimming apparatus 20 is reliable and durable and incorporates a low cost replaceable cutting element.

The present disclosure includes that contained in the appended claims as well as that of the foregoing description. Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and scope of the invention.

What is claimed is:

1. An improved host trimming apparatus for trimming a flexible hose, the hose having an internal bore encompassed by a sidewall, comprising in combination:

a support member adapted to be at least partially inserted within the internal bore of the hose;

a centering support secured to said support member for centering said support within the internal bore of the hose;

securing means including an expandable means disposed on said support member;

means for expanding said expandable means within the internal bore of the hose for securing said support member to the hose;

said support member defining an undercut between said centering support and said expandable means;

a cutting element rotatably mounted relative to said support member with said cutting element being aligned with said undercut; and means for rotating said cutting element relative to said support member enabling said cutting element to sever the sidewall of the hose adjacent said undercut as said cutting element is rotated relative to said support member with said centering support and said expandable means supporting the sidewall of the hose immediately adjacent said undercut to inhibit flexing of the sidewall of the hose when said cutting element is severing the sidewall of the hose.

2. An improved host trimming apparatus for trimming a hose as set forth in claim 1, wherein said support member includes a taper disposed thereon;

said securing means comprises an expandable collet; and an expander control disposed on said second end of said support member for enabling said taper to expand an expandable collet in response to said expander control for expanding said expandable collet within the internal bore of the hose for securing said support member to the hose.

3. An improved hose trimming apparatus for trimming a hose as set forth in claim 1, wherein said support member comprises a rod having a first and a second end;

said securing means including an expandable collet disposed proximate said first end of said support member; and said cutting element being rotatably mounted proximate said second end of said support member.

4. An improved hose trimming apparatus for trimming a hose as set forth in claim 1, including means for biasing said cutting element into engagement with the sidewall of the hose.

5. An improved hose trimming apparatus for trimming a hose as set forth in claim 1, wherein said means for biasing said cutting element into engagement with the sidewall of the hose includes spring means.

6. An improved hose trimming apparatus for trimming a hose as set forth in claim 1, including selector means having a non-engaging position and an engaging position;

said selector means inhibiting said cutting element from engaging with the sidewall of the hose when said selector means is in said non-engaging position; and said selector means permitting said cutting element to engage with the sidewall of the hose when said selector means is in said engaging position.

7. An improved hose trimming apparatus for trimming a hose as set forth in claim 1, wherein said means for rotating said cutting element relative to said support member includes said cutting element being affixed to a cutting arm; and journal means for journalling said cutting arm about said support member.

8. An improved hose trimming apparatus for trimming a hose as set forth in claim 1, wherein said means for rotating said cutting element relative to said support member includes said cutting element being affixed to a cutting arm;

journal means for journalling said cutting arm about said support member; and handle means for rotating said cutting element relative to said support member for enabling said cutting element to sever the sidewall of the hose as said handle means is rotated relative to said support member.

9. An improved hose trimming apparatus for trimming a flexible hose, the hose having an internal bore encompassed by a sidewall, comprising in combination:

a support member adapted to be at least partially inserted within the internal bore of the hose;

a tapered centering support secured to said support member for centering said support within the internal bore of the hose;

securing means including an expandable collet disposed on said support member;

means for expanding said expandable collet within the internal bore of the hose for securing said support member to the hose;

said support member defining an undercut between said tapered centering support and said expandable collet;

a cutting arm supporting a cutting element with said cutting arm being rotatably mounted relative to said support member with said cutting element being aligned with said undercut;

means for biasing said cutting element into engagement with the sidewall of the hose;

handle means rotating said cutting arm relative to the sidewall of the said support member enabling said cutting element to sever the sidewall of the hose adjacent said undercut as said cutting arm is rotated relative to said support member with said tapered centering support and said expandable collet supporting the sidewall of the hose immediately adjacent said undercut to inhibit flexing of the sidewall of the hose when said cutting element is severing the sidewall of the hose.

10. An improved hose trimming apparatus for trimming a flexible hose as set forth in claim 9, wherein said means for biasing said cutting element into engagement with the sidewall of the hose includes spring means; and selector means having a non-engaging position and an engaging position for inhibiting said cutting element from engaging with the sidewall of the hose when said selector means is in said non-engaging position and for permitting said cutting element to engage with the sidewall of the hose when said selector means is in said engaging position.

* * * * *

UNITED STATES PATENT AND TRADEMARK OFFICE
CERTIFICATE OF CORRECTION

PATENT NO. : 5,022,155

DATED : June 11, 1991

INVENTOR(S) : Wayne B. Hockett

It is certified that error appears in the above-identified patent and that said Letters Patent is hereby corrected as shown below:

Column 3, line 34, after "the" insert --sidewall of the hose is preferably a spring means.

Column 4, line 66, delete "with".
Column 6, line 24, after "secured" insert --to--.
Column 6, line 29, delete "of" and insert therefore --for--.
Column 6, line 58, after "pin" insert --spring 102 biases the locking pin 96 outwardly for engagement--.

Column 8, claim 1, line 1, delete "host" and insert therefore --hose--.
Column 9, claim 2, line 1, delete "host" and insert therefore --hose--.

Signed and Sealed this

Twentieth Day of October, 1992

Attest:

DOUGLAS B. COMER

Attesting Officer

Acting Commissioner of Patents and Trademarks